Feb. 8, 1966   C. W. HIGHBERG   3,233,369
GRINDING OF MATERIALS WITH HARD ABRASIVES
Filed May 11, 1962   4 Sheets-Sheet 1
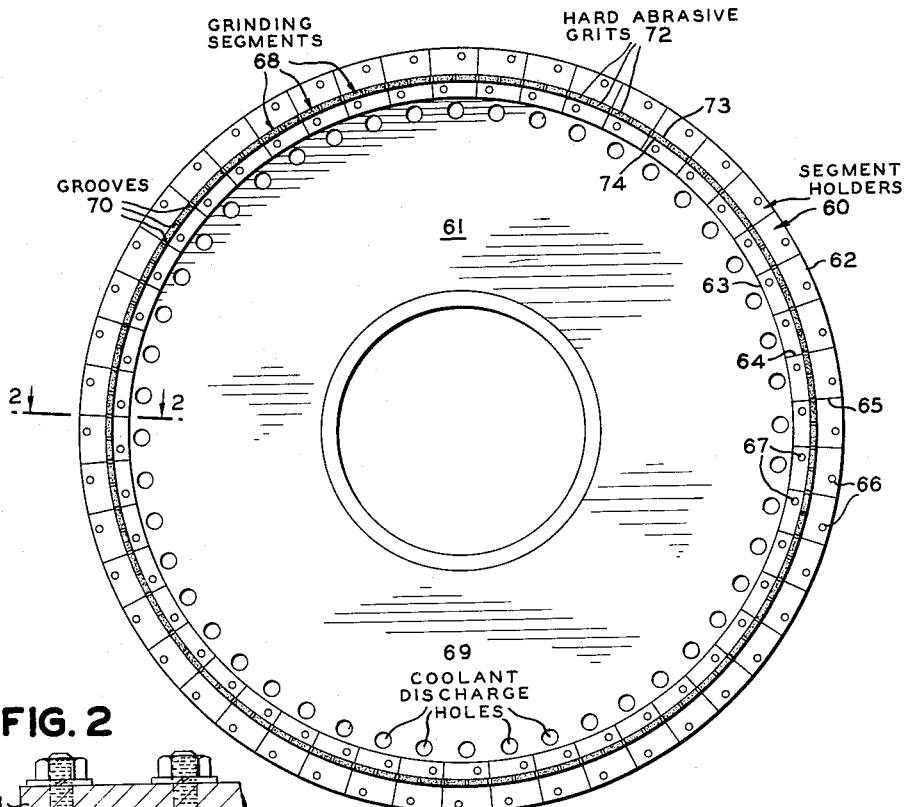
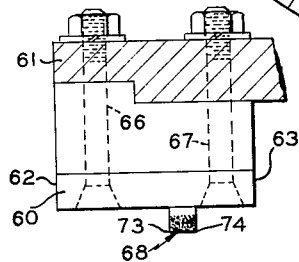
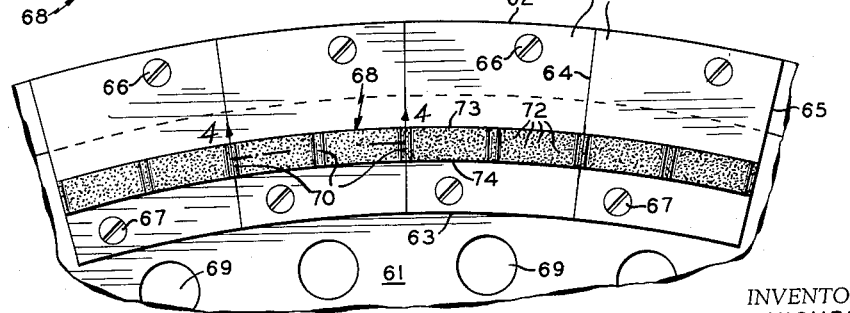
INVENTOR.
CARLE W. HIGHBERG
BY
ATTORNEY Feb. 8, 1966 C. W. HIGHBERG 3,233,369
GRINDING OF MATERIALS WITH HARD ABRASIVES
Filed May 11, 1962 4 Sheets-Sheet 2
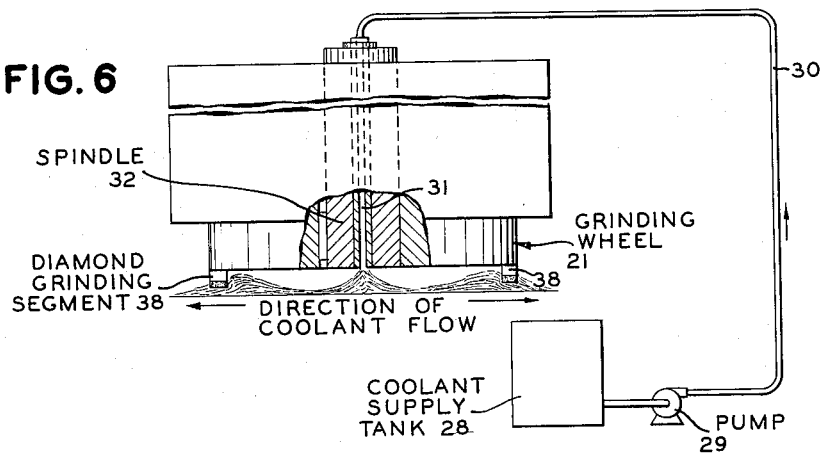
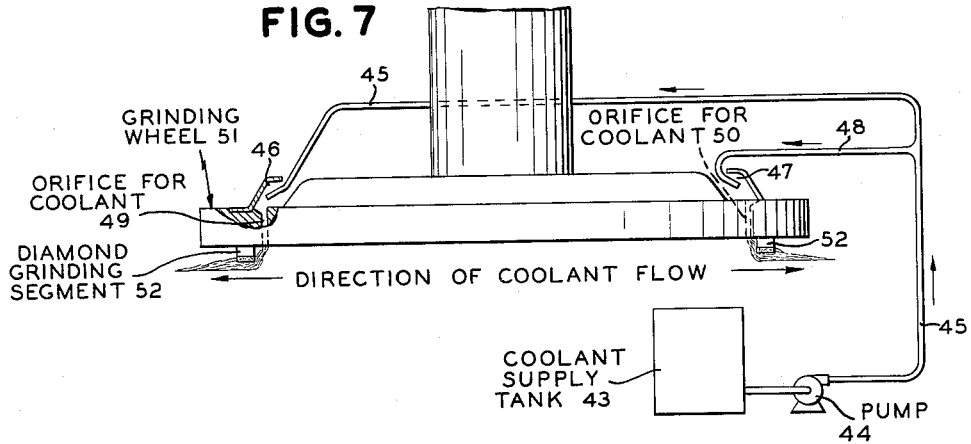
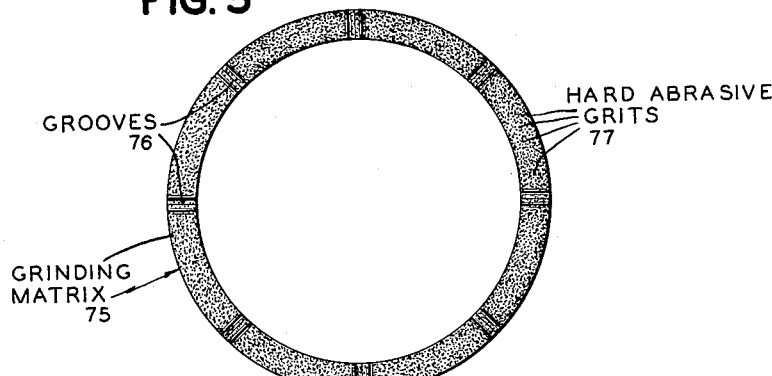
INVENTOR.
CARLE W. HIGHBERG
BY
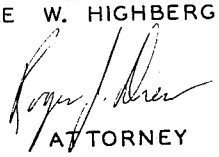
ATTORNEY Feb. 8, 1966 C. W. HIGHBERG 3,233,369
GRINDING OF MATERIALS WITH HARD ABRASIVES
Filed May 11, 1962 4 Sheets-Sheet 4
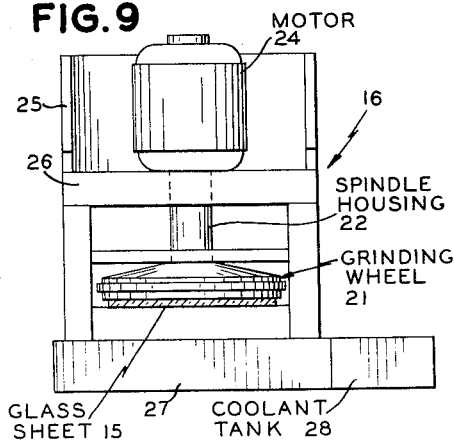
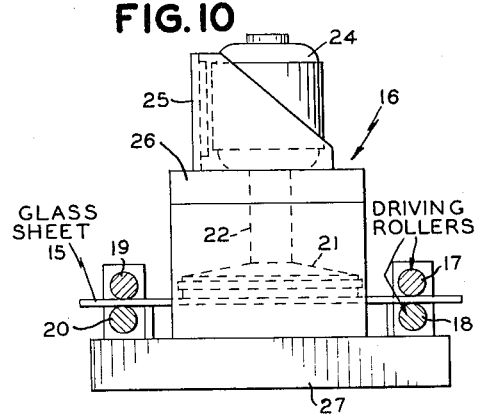
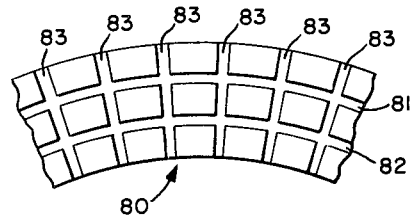
FIG. 11
INVENTOR.
CARLE W. HIGHBERG
BY
ATTORNEY

United States Patent Office

3,233,369
Patented Feb. 8, 1966

3,233,369
GRINDING OF MATERIALS WITH HARD
ABRASIVES
Carle W. Highberg, Murray Hill, N.J., assignor to Engelhard Hanovia, Inc., Newark, N.J., a corporation of New Jersey
Filed May 11, 1962, Ser. No. 193,925
10 Claims. (Cl. 51—110)

This is a continuation-in-part of my copending application Serial No. 119,444, filed June 26, 1961, now Patents No. 3,177,628.

This invention relates in general to the grinding of materials with hard abrasives, and more particularly, to a new and improved method and apparatus for grinding and/or honing of surfaces or edges of materials such as, for instance, glass, stone, ceramics, cemented carbides and ferrous metals.

As is developed hereinafter, the studies which led to the broad concepts of the present invention have been generally carried out on the special application of grinding glass with diamond grinding wheels. However, it is to be understood that the principles of this invention are not restricted to only diamond grinding of glass but are equally applicable to the grinding of various other materials, for instance stone, e.g., marble, granite, etc., ceramics, e.g., silicon carbide (Carborundum), aluminum oxide, etc., cemented carbides, e.g., tungsten carbide, and ferrous metals, e.g., hard steels containing V, W, Cr, Co, or combination of these alloying metals, employing hard abrasives other than diamonds, for instance cubic boron nitride.

In the prior art manufacture of plate glass, the plate is continuously extruded from the melting furnace, followed by passage through an annealing chamber. From the annealing chamber, the plate glass is subjected to grinding and polishing, typically involving passage first through twenty eight successive beach sand grinding stations. The grinding operation is carried out at each of these stations by large grinding heads having vertically mounted spindles, which have horizontal grinding surface extending across the width of the plate glass. After the grinding at such beach sand stations, additional polishing is required, typically at forty two additional stations, wherein the polishing heads also have vertical spindles, and iron oxide or rouge is employed as abrasive. This prior art process for grinding plate glass is disadvantageous for the reasons that a large amount of expensive machinery and floor space is required, and the facilities and manpower required for handling the bulky abrasive are very costly.

In my co-pending application Serial No. 50,352, filed August 18, 1960, now abandoned, a considerable improvement in the grinding and polishing of glass is provided by the replacement of the first two-thirds or more of such seventy stations of grinding and polishing with a lesser number, such as 15 or less stations of diamond grinding. This large reduction in the number of grinding stations required was achieved by the use of diamond grits or particles in the surface portion of the grinding heads instead of the beach sand. This method is a considerable improvement for the reasons that the amount of floor space, machinery and manpower required in the processing of the plate glass is considerably reduced, with resulting reduced cost of the entire operation. In this improvement method, the diamond concentration in terms of carats per cubic inch of grinding wheel matrix is relatively low in the initial stations of rough grinding and is increased in the additional successive grinding stages and later stages with a corresponding reduction in diamond particle size, the diamond concentrations being the largest or highest in the late stages.

A further improvement in the grinding of glass over that of application Serial No. 50,352 is disclosed and claimed in my copending application Serial No. 119,444, filed June 26, 1961. In the method of application Serial No. 119,444, diamond grinding of the glass is carried out in initial stations with wheels having a low concentration of diamonds of predetermined grit size, followed by diamond grinding the glass in additional successive stations with wheels having higher concentrations of smaller grit size diamonds than in the initial stations, and diamond grinding the glass in late stations with wheels having low diamond concentrations materially lower than those of the wheels of the additional successive stations and which can also be materially lower than the diamond concentrations of the wheels of the initial stations, the diamond grits of the wheels of the late stations being of still smaller grit size. The grinding wheels employed in all stations have a predetermined concentration of diamond grits bonded in the leading and trailing edges of the wheel, and these predetermined grit concentrations at the wheel leading and trailing edges should be controlled within close limits to obtain optimum results. It was also found that the presence of a predetermined concentration of diamond grits bonded in the wheel intermediate cutting surface, i.e., the cutting surface or face between the leading and trailing edges of the wheel, was of importance for obtaining good results. The method and apparatus of this application achieve a striking economy in the quantity of diamonds required and a considerable reduction in overall costs as well as a considerable prolonging of the life of the grinding wheel, reduction in breakage and damage to the glass, and obtainment of grinding results that are predictable and can be duplicated. In a preferred embodiment of application Serial No. 119,444, the grinding wheels are segmented with the grinding segments being arranged on the wheel support in a generally circular arrangement preferably adjacent the peripheral edge portion of the support. The grinding segments each comprise a matrix having diamond grits bonded therein. More preferably the grinding segments are arranged on the wheel support in a continuous narrow arrangement with minimum spacing between neighboring segment edge portions. By reason of this circular arrangement of the segments on the wheel support, a considerably prolonged life of the wheel is achieved.

In accordance with the present invention, it has been found that the combination of (1) grooved grinding wheels, preferably radially grooved wheels with a metal matrix bonding the grits, (2) hard abrasive grits on these grooved wheels of preferably a grit size of 200–230 grit size or finer, more preferably within the range of 500–2500 grit size, and (3) liquid coolant supplied to the wheels during the surfacing resulted in a significant improvement in the surfacing of the plate glass at late stations of the grinding method of application Serial No. 119,444. Narrow grooves are generally used as will be specifically discussed hereinafter, relatively wide grooves having little or no advantage. Further, unnecessary width of grooves cuts down on the available grinding surface. This combination of the three features mentioned above of this invention significantly improved the plate glass surfacing at a variety of grit sizes within these ranges.

In the grit size range of 500–2500 grit size, grit sizes of the abrasive within the range of 1050–1500 grit size are especially preferred.

The grinding apparatus of this invention comprises a rotatable spindle, a grinding wheel mounted on the spindle, means for rotating the spindle and hence the grinding wheel, and means for feeding plate glass through the apparatus for surfacing by the wheel. The grinding wheel comprises a support member, a matrix preferably of metal on the support member providing a grinding surface, and means for securing the matrix to the support. A plurality of spaced grooves are provided in the grinding surface, diamond grits or grits of other hard abrasive materials hereinafter disclosed and of the grit size previously disclosed are bonded in the metal matrix, and means are provided for supplying a liquid coolant to the wheel, preferably to its inner grinding edge.

The grooves employed are preferably radial; i.e., extending outwardly in radial fashion with the center of the wheel their origin if they were extended inwardly this extent. However, in addition to the radial grooves, concentric grooves can be utilized, i.e., grooves arranged concentrically with respect to the center of the wheel and one another in the grinding surface. Concentric grooves may be desirable particularly where the grinding surface radial dimension is large and such concentric grooves would suitably intersect the radial grooves. The grooves are equally or substantially equally spaced in the wheel grinding surface and preferably extend from the inner to the outer edges of the cutting surfaces.

Width of the grooves is related to size of the abrasive grits used. In general, the use of coarser abrasive grits requires greater width grooves and smaller size grits narrower width grooves. For instance, for 12 foot diameter wheels, grooves having width of preferably from about .005″–.023″ are employed when grits of particle size of about 8–25 microns (1050 grit size) are used, and grooves of width of preferably from about .010″–.045″ are employed when larger size grits of particle size of about 30–50 microns (500 grit size) are used.

The grooves can be provided in the wheel grinding surface after the wheel has been made by cutting by means of any suitable cutting tool well known to those skilled in the art, or by spacing the abrasive segments, usually present in wheels over 18 inch outer diameter, a sufficient distance when mounting same on the wheel holder to provide the grooves. Thus the term "groove" or "grooves" is used in a broad sense herein to include not only grooves provided in the grinding surface by cutting, gouging, etc., but also provided by spacing apart the abrasive segments the desired distance, or by the combination of cutting, gouging, etc., and the spacing apart of the abrasive segments.

The shape of the grooves is an important consideration. V-shaped grooves as will be shown in the embodiment of this invention of FIG. 4 may be used, but it is preferred to work with flat-bottomed grooves of uniform or substantially uniform width since in such case the groove width does not change as the grinding surface wears away.

While it is not definitely known why or how these grooves exert their beneficial effect, one plausible explanation is that the grooves serve to aid in the removal of the abrasive debris from the wheel cutting surface. The presence of this abrasion debris has resulted in unsatisfactory results heretofore when wheels with 1050 grit size abrasives and a diamond concentration of 0.25 carats/cu. in. were used. In fact, such wheels could not be operated even at nominal downfeeds without excessive burnishing of the glass. The cause of this difficulty has been attributed to the lodging of abrasion or grinding debris on or contiguous to the cutting surface of the wheel. Further, when 2500 grit size diamond wheels were used, the metal bond or matrix utilized actually became embedded in the glass at nominal glass removals and no grinding could be accomplished. However, the presence of the grooves spaced preferably radially at equal or substantially equal intervals on the grinding heel having the fine abrasive particles or grits in accordance with this invention results in superior grinding wheel life, and in superior surface finish of the material being ground and polished. It also enables satisfactory and economical use of wheels with particle size abrasives of 1050 grit size (8–25 micron size), whereas formerly such wheels could not be operated satisfactorily. It also makes possible the use of wheels with finer size abrasives than 1050 grit size. Specifically, in accordance with this invention, it has been found that wheel life of 3,000 cubic inches of glass/carat or greater can be planned on and attained for plate glass surfacing with diamond grit sizes of this invention including 1050 grit size, at the usual downfeeds or glass removal rates employed with such grit size wheels.

The width of the grooves, in addition to being a function of the size of the abrasive grits used, is also a function of wheel size with wider grooves utilized with smaller size wheels and narrower grooves employed with larger size wheels. The grooves must be of sufficient size to clear away abrasion or grinding debris. However, the groove width should not be so large that the diminution of the concentration of the particles at the leading and trailing edge of the wheel is such that it lowers the grinding life of the wheel. In typical runs, grooves 1/16th inch in width were found advantageous in wheels with 200–230, 500 and 1050 grit size diamonds in wheels of 3 inch O.D. (i.e., outer diameter) and 30 inch O.D. However, in larger size wheels such as for instance a 12 foot O.D. wheel with 1500 grit size diamonds, grooves smaller than 1/16th inch and typically 0.009 inch in width are preferred.

The frequency of grooves required for optimum performance is also a function of the grit or particle size and the wheel size. For a given grit size, the number of grooves required increases with the size of the wheel. For example, with diamond wheels operated at about 2850 surface feet per minute, favorable grinding with 500 grit size diamonds was observed with 3 inch O.D. cup wheels containing four grooves each of 1/16th inch width and with 30 inch O.D. segmented wheels containing 96 grooves each of 1/16th inch width. The optimum frequency of the grooves for a particular wheel size increases with the decrease in particle or grit size. For instance, it has been found that with three inch O.D. cup wheels with 1/16th inch width radial grooves, the optimum number of grooves was as follows:

| Grit size: | Optimum number of grooves |
|---|---|
| 500 | 4 |
| 1050 | 8 |
| 1500 | 16 |

There is a disadvantage in increasing the number of grooves over certain values for given wheels. Once the grooves are present in such quantity as to permit sufficient coolant to contact the cutting surface of the wheel, additional grooves may materially sacrifice the concentration of diamond grit in the leading and trailing edges of the wheel with resultant loss of diamond life of the wheel.

Coolant is employed for absorbing heat from the grinding surface, which improves the life of the grinding wheel, and this coolant is preferably delivered or supplied to the inner cutting edge of the wheel, such delivery of the coolant being of considerable importance to the performance of the diamond wheels. It was found that by reason of supplying the coolant to the inner cutting edge of the wheel, the coolant is most efficiently utilized in contrast to delivery of the coolant to the outer cutting edge of the wheel which gives less efficient use of the coolant. By the interior delivery of the coolant, centrifugal force causes it to contact all the exposed diamond grit surface, provided the segments are placed with minimum spaces between them. However, particularly with large grinding wheels, it may be useful also to apply coolant to the outer cutting edges. The coolant can be supplied to the inner cutting edge of the wheel by means of a hollow shaft spindle, or with larger wheels preferably by flowing down the inner edges of the grinding segments through suitably disposed orifices or holes in the diamond wheel. The coolant is an oil in water emulsion type and preferably comprises, by volume, from about 20–100 parts of water per each one part of coolant concentrate (oil and emulsifier).

For use with the coolant and grooves, wheels having the diamond grits bonded thereto with metal are preferred. Among these metal bonded wheels, a copper-based alloy, i.e., an alloy containing a major proportion of copper is the preferred bonding material or matrix. In addition to the copper, other metals advantageously present in the alloy of the bonding material or matrix include one or more of zinc, tin, silver, aluminum, beryllium, manganese and iron. Brasses and bronzes are particularly suitable. A typical analysis of one brass matrix well suited for use in the grinding wheels of this invention for bonding the diamond grits is the following:

| Element: | By weight |
|---|---|
| Copper, % | 70 |
| Zinc, % | 30 |

A typical analysis of one bronze matrix well suited for use in bonding the diamond grits in the wheels is the following:

| Element: | By weight |
|---|---|
| Copper, % | 80 |
| Tin, % | 20 |

The hard abrasives used for the grinding of this invention can be any of those having a hardness number of at least 8, preferably at least 12 on the Extension of Mohs' Scale or Metal Equivalent columns in the following tabulation.

| Extension of Mohs' Scale | Metal Equivalent | Mohs' Scale |
|---|---|---|
| (6) Orthoclase or periclase | | (6) Orthoclase. |
| (7) Vitreous pure silica | | |
| (8) Quartz | (8) Stellite | (7) Quartz. |
| (9) Topaz | | (8) Topaz. |
| (10) Garnet | | |
| (11) Fused zirconia | (11) Tantalum carbide | |
| (12) Fused alumina | (12) Tungsten carbide | (9) Sapphire. |
| (13) Silicon carbide | | |
| (14) Boron carbide | | |
| (15) Diamond | | (10) Diamond. |
| (16) Cubic boron nitride | | |

This tabulation is adapted from Ridgeway et al., Trans. Electrochem. Soc. 63, 369 (1933) by addition of cubic boron nitride at a number 15 hardness as equivalent to diamond.

As set forth in the foregoing tabulation, materials having a hardness number of 8 and higher on the Extension of Mohs' Scale include quartz, topaz, garnet, fused zirconia, fused alumina, silicon carbide, boron carbide, diamond and cubic boron nitride. In the Metal Equivalent column, stellite has a hardness number of 8 which is equivalent to that of quartz, tantalum carbide has a hardness of 11 which is equivalent to that of fused zirconia, and tungsten carbide has a hardness of 12 which is equivalent to that of fused alumina or sapphire. It is known that cubic boron nitride will scratch diamond and that diamond will scratch cubic boron nitride, so that they are properly considered as equivalent in hardness.

The disclosures herein of preferred diamond concentrations for the grinding, and in particular surprisingly low diamond concentrations in late stages of grinding glass are not restricted to diamond grinding of glass. These surprising results are obtained also in the grinding of various other materials, for instance stone and ceramics, with other hard abrasives such as those enumerated above having a hardness of 8 or higher, preferably 12 or higher on the Extension of Mohs' Scale, preferably when the abrasive is used in a grinding wheel and a coolant is employed. A particularly effective hard abrasive other than diamond is cubic boron nitride. Stone which can be ground in accordance with the present invention includes marble, granite, etc. and ceramics which can be ground include silicon carbide (Carborundum), aluminum oxide, etc.

Diamonds are now available from both natural and synthetic sources, but cubic boron nitride is solely a synthetic product. Synthetic diamonds and synthetic cubic boron nitride are known to be produced by use of high pressure, greater than 30,000 atmospheres, with catalytic promotion. There have also been reports of successful chemical production of synthetic cubic boron nitride without use of high pressure. It is reasonably possible that in the near future cubic boron nitride may be available at a lower price than diamonds. Cubic boron nitride is described by R. H. Wentorf, Jr., in J. Chem. Phys. 26, 956 (1957).

In the drawings:

FIGURE 1 is a plan view of a grooved, segmented grinding or surfacing wheel of this invention;

FIGURE 2 is a section taken on line 2—2 of FIGURE 1;

FIGURE 3 represents an enlargement of a portion of the wheel of FIGURE 1;

FIGURE 4 is a section taken on line 4—4 of FIGURE 3;

FIGURE 5 is a plan view of a grooved cup wheel of this invention, which cup wheel is a smaller wheel than the segmented wheel of FIGURE 1;

FIGURE 6 is an elevational section through the hollow shaft spindle of a grinding wheel of the present invention, the coolant being supplied to the inner cutting edge of the wheel through the enclosed central passageway of the hollow spindle, this figure also showing the pump and conduit for supplying the coolant from the coolant supply tank to the hollow shaft spindle;

Figure 8:
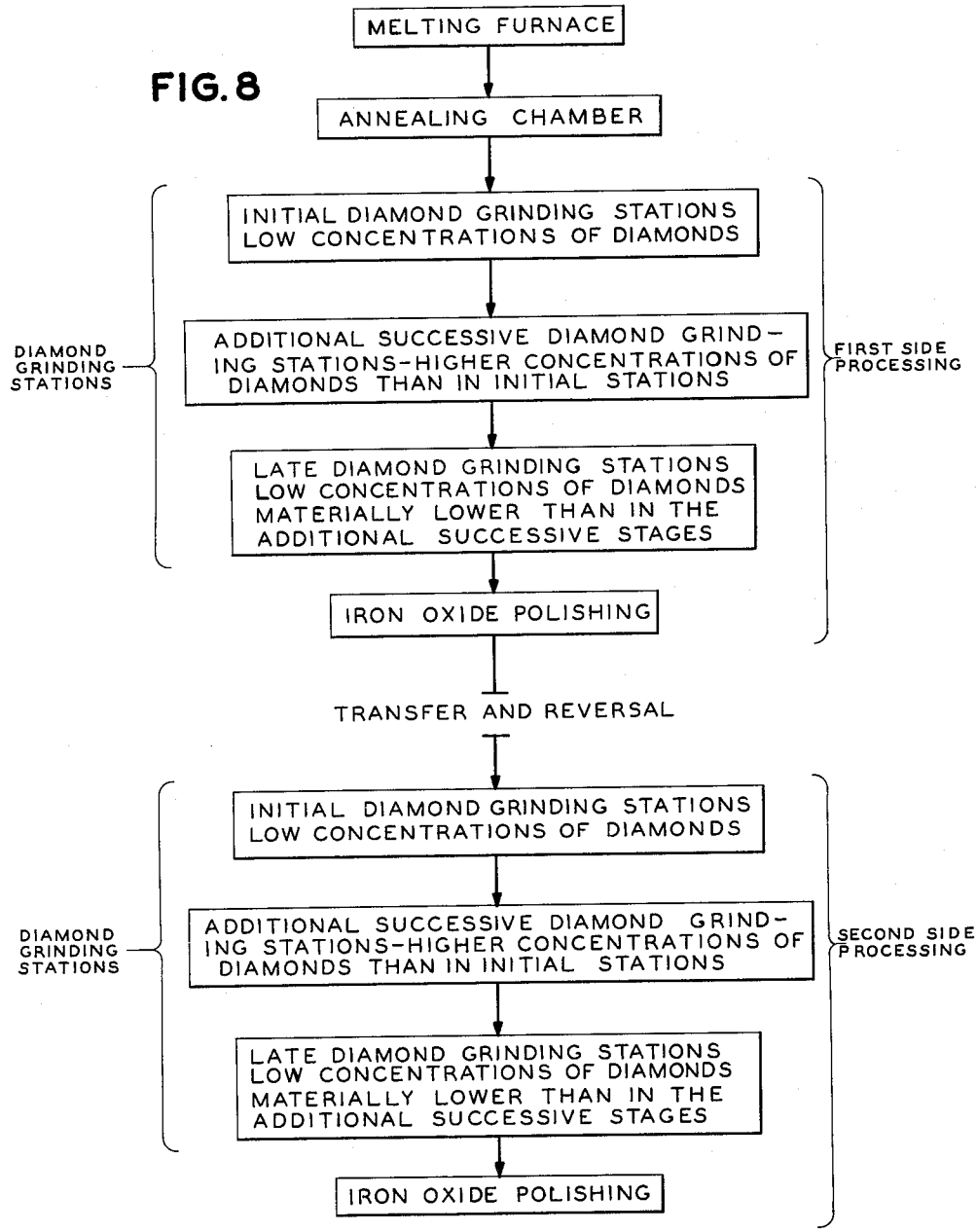

FIGURE 7 is an elevational section through the spindle and grinding wheel of a larger grinding wheel of the invention and showing coolant-supply orifices or holes in the wheel support, these orifices communicating with a coolant-supply conduit leading from a coolant-supply tank, this figure also showing the coolant-supply tank and pump for supplying the coolant to the orifices and hence to the inner cutting edge of the wheel;

FIGURE 8 is a diagram representing a method of the present invention utilizing the diamond surfacing;

FIGURE 9 is a side elevational view of a single diamond grinding station for use in the present invention;

FIGURE 10 is also a side elevational view of a single grinding station for use in the method and apparatus of the present invention, the view also showing means for feeding the glass through the station; and FIGURE 11 is a partial plan view of an alternate embodiment of a wheel matrix grinding surface having a plurality of spaced concentric grooves formed therein and intersecting with radial grooves.

With reference to FIG. 1, segment holders 60 are mounted on generally circular wheel support 61. Segment holders 60 are plates having slightly curved outer and inner peripheral edge portions 62 and 63 respectively with lateral edge faces 64 and 65 tapering slightly inwardly from the outer to the inner edge. Bolts 66 and 67 are integral with the upper surface of segment holders 60 and have threaded outer end portions, these mounting bolts extending through registering orifices in the wheel support 61 to mount the segment holders securely to the wheel support with the aid of nuts on their threaded end portions.

Grinding segments 68 are secured to the lower surface or side of segment holders 60 by brazing to provide a diamond grinding plane extending generally perpendicular to the central axis of the support. As shown, segments 68 are secured to the segment holders one per segment holder. Spaced holes or orifices 69 function to discharge liquid coolant to the inner edges of grinding segments 68. The wheel of FIG. 1 is an approximately 30 inch diameter wheel.

Radial grooves 70 are provided in the cutting surface of segments 68, which grooves are V-shaped in cross section in the embodiment shown in FIG. 4. These grooves together with the fine hard abrasive grits 72 of predetermined grit size embedded in the matrix of these grooved cutting segments and the supply of liquid coolant to the wheel grinding surface during the surfacing result in a significant improvement in the surfacing of the plate glass at the late stations of the grinding method of my copending application Serial No. 119,444, these late stations usually employing grit sizes of 200–230 grit size and finer.

Grinding segments 68 are secured to segment holders 60 in such manner as to cooperate with one another to form a continuous or substantially continuous narrow circular grinding face or plane located adjacent the periphery of the wheel support. The width of each segment of this circular arrangement is typically about 0.250 inch, and this circular arrangement of segments is located typically about 1 inch from the outer peripheral edge of the wheel support. The abrasive grits are embedded and dispersed in the matrix of each segment and as wear proceeds during the surfacing are exposed on the surface of the matrix. By reason of the continuous circular arrangement of the segments, a maximum number of abrasive grits are provided at the leading edge 73 and trailing edge 74 of the segments.

A cup-type wheel 75 is shown in FIG. 5, this wheel having radial grooves 76. As shown, cup wheel 75 has 8 radial grooves each 1/16 inch wide. Wheel 75 is a 3-inch diameter wheel. Diamond grits 77 are embedded in the matrix of this cup wheel.

With reference to FIG. 8, in a specific embodiment, a sheet of plate glass, which is continuously extruded in the melting furnace, is passed through the annealing chamber in conventional and known manner. From the annealing chamber the glass sheet is passed successively to each of the initial diamond grinding stations, these initial grinding stations being typically 3 in number. Principal irregularities present in the surface of the glass are removed in these initial grinding stations.

Referring now to FIGS. 9 and 10, the sheet of plate glass 15 is fed through an initial grinding station 16 by driving rollers 17, 18, 19 and 20 shown in FIG. 10. Alternatively, the glass sheet may be blocked, clamped, or otherwise secured to a suitable supporting surface and fed with the supporting surface through the grinding stations. The grinding station 16 comprises a generally circular diamond grinding wheel 21 having a diameter greater than the width of the glass sheet 15. Grinding wheel 21 is mounted coaxially on a rotatable vertical spindle contained within bearing housing 22, wheel 21 being driven by motor 24 which is mounted above wheel 21 on supporting frame 25 made up of suitable supporting members. Grinding wheel 21 comprises a generally circular support and a plurality of grinding segments having radial grooves in the segment cutting surface as hereinbefore described and mounted on one side of the support in a generally circular arrangement adjacent the peripheral edge portion of the support as hereafter described. Supporting frame 25 is supported by main frame 26 of the grinding station, which also supports bearing housing 22 for the vertical spindle of grinding wheel 21. Base 27 of the grinding station provides a heavy rigid support for the entire apparatus. A suitable coolant tank 28 and associated coolant pump is provided for recirculating coolant to the working surface between the grinding wheel 21 and the plate glass 15. The coolant is preferably supplied or delivered to the inner cutting edge of the grinding wheels as previously discussed, for instance by means of a hollow spindle.

As shown in FIG. 6, the coolant is pumped from coolant supply tank 28 by means of pump 29 through conduit 30 into the central passageway 31 of hollow shaft spindle 32 for grinding wheel 21, passageway 31 extending along the axis of spindle 32 and communicating one end of the spindle with the opposite end thereof. By reason of the centrifugal force obtaining as a result of rotation of the wheel 21, the coolant flows in an outwardly direction as indicated by the arrows to the inner cutting edge and into contact with all of the exposed diamond grit surfaces and the surfaces of grooved grinding segments 38. As shown in FIG. 7, with the larger grinding wheels, for instance wheels having diameter of 30" and larger, the coolant is pumped from coolant tank 43 by pump 44 through conduits 45 and 48 into ante-chambers 46 and 47 respectively which communicate with a plurality of spaced holes or orifices 49 and 50 in the grinding wheel 51. The spaced orifices, which communicate one side of the wheel support with the opposite side thereof, are arranged in a generally circular arrangement adjacent and inwardly of the inner edge of the circular or generally circular arrangement of grooved diamond segments and function to dischage the coolant to the inner edge of the grinding segments 52, whereby the centrifugal force resulting from rotation of wheel 51 causes the coolant to flow in an outwardly direction as indicated by the arrows to the inner cutting edge and into contact with all of the exposed diamond grit surfaces and the surfaces of grinding segments 52.

Grinding segments 68, shown in FIG. 4, each have typical dimensions of length of about 1 13/16", width of about 0.230", and depth or thickness of about 1/8". The area of the grinding face of each segment 68 is typically about 0.415 square inch. Segment holders 60 each have typical dimensions of length of 1 13/16" where segments are attached, width of 2 1/16", and thickness of 5/16".

In the initial grinding stations, the surface of the plate glass is roughly ground to remove the principal irregularities in the surface of the glass. As disclosed in FIG. 8, the diamond concentration, in terms of carats per cubic inch of wheel matrix, is relatively low in the initial stations, usually the first three stations. However, the diamond grit or mesh size should be relatively large in these initial stations. The expressions "grit size" and "mesh size" are used synonymously herein referring to particles or grits passing through sieves of the specified number of linear openings per inch. Recently sieves of good precision with openings smaller than 325 mesh have become available, and this invention includes in part the use of grits of such smaller size.

Specifically, diamod concentrations of less than 20, preferably about 9 carats per cubic inch of grinding segment matrix may be utilized for the initial stations. The grit size is preferably about the 50 to 60 grit size inasmuch as the larger grit sizes, say of the order of 20 to 30, tend to cause excessive chipping of the edges of the plate glass. Further, in these initial stations, typical operating conditions are a feed speed of about 200" per minute of the glass relative to the grinding wheel, and a cut of about .004". The grit size figures specified indicates that the diamond grits will pass through a screen of a certain mesh size but will not pass the screen of the next mesh size. Thus, for example, 50 to 60 grit diamonds will pass through a 50 mesh screen but will not pass through a 60 mesh screen. The basis for mesh sizes in the present specification is the U.S. Sieve Series.

Further, as shown in FIG. 8, as the sheet of plate glass advances from the initial grinding stations to additional successive grinding stations, where additional increments of stock are removed from the plate glass, the concentration of diamonds in carats per cubic inch of wheel matrix is increased, i.e., is higher in these additional successive stations than in the initial stations. Further, there is a corresponding reduction in size of the diamond particles and a reduction in the depth of the cuts. Diamond concentrations of about 20 carats and higher, preferably about 20 carats per cubic inch of grinding segment matrix are employed in the wheels of the additional successive stations. The average grit size at these intermediate or additional successive stations is about 100–120 grit size. Typical operating conditions in these intermediate or additional successive stations, which are usually Stations No. 4–7 of the present invention, are a feed speed of about 200″ per minute of glass relative to the grinding wheel, and a cut of about .002″.

As shown in FIG. 8, the glass sheet is then advanced to the later or late grinding stations, these late grinding stations usually being Stations No. 8–14. It is found that employment of low concentrations of diamond grits in these later or late stations materially lower than employed in the additional successive stages, with the grits substantially uniformly dispersed and bonded in the grinding segment matrix, gives excellent grinding results with a striking economy in diamond requirements and a considerable reduction in surfacing costs. The use of these lower concentrations of diamond grits with good results in the late stations is directly contra to what was previously believed. Diamond concentrations which can be materially lower than 9 carats, preferably lower than 1 carat per cubic inch of grinding segment matrix, are employed in the wheels of these late stations. This reduction in diamond requirements can be readily seen from the following Table III.

In each case new polished plate glass was used for a test. However, it is believed that late station grinding of glass previously ground with coarser grit diamonds would generally afford longer wheel life, require less spindle power, and give operation with less tendency to glass breakage; thus, all wheel life figures in Table III for the late stations must be considered conservative.

As regards the data presented in Table III, the data given for Optimum Width of Cutting Face of Wheel, Surface Finish, and Wheel Life were actually measured at Stations 1, 2, 3, 5, 7, 8, 10 and 12. The data for Stations 4, 6, 9, 11 were interpolated and those for Stations 13 and 14 were extrapolated. The surprisingly low diamond concentrations of the Station 10 and 12 data were particularly interesting.

Diamond grinding in accordance with this invention, as shown in Table III, requires typically ten stages to replace the conventional twenty-eight sand grinding stages. Diamond grinding stages Nos. 11 to 14 replace on the order of two-thirds of the conventional iron oxide or rouge polishing stages; about fifteen additional rouge stages in accordance with conventional methods for final polishing of plate glass are sufficient after the fourteen diamond grinding stages.

The considerable reduction in diamond requirements for the wheels of the late stations is readily apparent from the data of Table III, the wheels of late Stations 10–14 having optimum diamond concentrations of from only 1 carat per cubic inch of matrix down to as low as .05 carat per cubic inch of matrix as contrasted with the wheels of initial Stations 1–3 and additional successive Stations 4–7 having a considerably higher diamond concentration. Concentrations of diamonds as low as .05 carat per cubic inch and even lower can be used with satisfactory results in the wheels of the late stations in accordance with this invention. In connection with these late stations, it was found to be of the utmost importance to control within close limits the number of concentration of diamond grits in the leading and trailing edges of the wheel.

TABLE III

*Typical plate glass grinding with diamonds*

| Station No. | Grit Size | Diamond Concentration in Carats/In.³ | Optimum Width of Cutting Face of Wheel (Mils) | Glass Removal (Mils) | Surface Finish (Microinches) | WHEEL LIFE | |
|---|---|---|---|---|---|---|---|
| | | | | | | Ft.² of Glass/Carat | In.³ of Glass/Carat |
| 1 | 50– 60 | 9 | 250 | 6 | 220 | 5,200 | 3,000 |
| 2 | 50– 60 | 9 | 250 | 4 | 220 | 5,200 | 3,000 |
| 3 | 50– 60 | 9 | 250 | 4 | 220 | 5,200 | 3,000 |
| 4 | 70– 80 | 15 | | 3 | 140–170 | 6,900 | 3,000 |
| 5 | 100– 120 | 20 | 160 | 2 | 90–110 | 10,400 | 3,000 |
| 6 | 120– 140 | 16 | | 1.5 | 70– 90 | 13,300 | 3,000 |
| 7 | 140– 170 | 12 | | 1.3 | 60– 70 | 16,800 | 3,000 |
| 8 | 200– 230 | 9 | 280 | 1.0 | 40– 50 | 20,800 | 3,000 |
| 9 | 270– 325 | 5 | | 0.75 | 25– 35 | 29,700 | 3,000 |
| 10 | 500 | 1 | 400 | 0.5 | 12– 20 | 41,600 | 3,000 |
| 11 | 850 | 0.6 | | 0.25 | 8– 12 | 83,300 | 3,000 |
| 12 | 1,050 | 0.2 | | 0.2 | 6– 8 | 104,000 | 3,000 |
| 13 | 1,250 | 0.1 | | 0.15 | 4– 6 | 139,000 | 3,000 |
| 14 | 2,500 | 0.05 | | 0.1 | 2– 3 | 208,000 | 3,000 |
| | | | | 24.75 | | | |

In the tests of Table III a 3-inch outer diameter cup wheel was used (actually 2⅞ inch outer diameter of the grinding surface). Two inch by 18 inch glass specimens were moved reversibly in the long direction at a feed speed of 200 inches per minute. Coolant concentration and flow rate were maintained constant during the periods of the tests.

The conclusions regarding preferred diamond concentrations embodied in the Table III programming resulted in considerable part from experiments showing superior wheel performance at the specified diamond concentrations than found at higher or lower concentrations. In general, favorable grinding performance under each condition was found for a particular range of diamond concentrations, with less satisfactory performance outside of these preferred ranges. The basis for choice of such ranges is shown in Table IV, which contains results for 50–60 grit size diamonds used for Stations 2 and 3, for 100–120 grit size diamonds used for Station 5, for 200–300 grit size diamonds used for Station 8, for 500 grit size diamonds used for Station 10, and 1050 grit size diamonds used for Station 12.

from the melting furnace and rollers is referred to in the data shown in Tables III and IV. In general, the number of stages necessary for grinding of any material depends on the initial roughness of its surface. For material with smoother surface than glass from the melting furnace, the initial stages described in Table III will be unnecessary and may be omitted. For example, if it is desired to convert sheet glass to plate glass by a glass re-

TABLE IV

*Effect of varying diamond concentration on wheel performance*

[All tests at table speed of 200″ per minute. 3″ outer diameter cup wheels used.]

| Grit Size | Diamond Concentration (Carats/cu. in. of matrix) | Wheel Life (cu. in. of glass carat) | Net Spindle Power (Watts) | Average Surface Finish (Micro-inches) | Glass Breakage (⅛″ thick glass) (percent) | Sequence of Tests | Preferred Diamond Concentration Range |
|---|---|---|---|---|---|---|---|
| 50–60 [1] | 6 | 680 | 500 | 310 | 0 | | |
| 50–60 | 7.5 | 2,090 | 707 | 229 | 0 | | |
| 50–60 | 9 | 2,561 | 723 | 230 | 0 | | 7.5 to 18. |
| 50–60 | 18 | 2,624 | 1,150 | 162 | 40 | | |
| 50–60 | 36 | | | | 100 | | |
| 100–120 [2] | 9 | 1,545 | 328 | 143 | 0 | | |
| 100–120 | 20 | 3,551 | 410 | 108 | 0 | | 15 to 60. |
| 100–120 | 40 | 2,996 | 640 | 85 | 0 | | |
| 100–120 | 60 | 2,670 | 490 | 80 | 30 | | |
| 200–230 [3] | 3 | 1,067 | 197 | 74.2 | 0 | 2 | |
| 200–230 | 6 | 2,324 | 268 | 55.8 | 0 | 2 | |
| 200–230 | 9 | 2,593 | 320 | 47.8 | 0 | 2 | |
| 200–230 | 30 | 1,250 | 520 | 42 | 0 | 1 | 5 to 50. |
| 200–230 | 50 | 1,323 | 600 | 42 | 7 | 1 | |
| 200–230 | 70 | 777 | 630 | 39 | 8 | 1 | |
| 500 | 0.5 | 2,388 | 370 | 20 | 0 | 3 | |
| 500 | 1 | 2,678 | 450 | 21 | 0 | 3 | |
| 500 [4] | 1.5 | 3,900 | 503 | 18 | 0 | 3 | |
| 500 | 3 | 3,216 | 570 | 18 | 0 | 3 | |
| 500 | 6 | 1,403 | 725 | 21 | 0 | 3 | |
| 500 | 9 | 1,041 | 854 | 25 | 20 | 2 | .5 to 9. |
| 500 | 20 | 621 | 768 | 29 | 40 | 1 | |
| 500 | 40 | 68 | 1,250 | 33 | 100 | 1 | |
| 500 | 60 | 2 | Excessive | | 100 | 1 | |
| 1,050 [5] | .25 | 4,035 | 480 | 10 | 0 | | |
| 1,050 | .5 | 733 | 360 | 9 | 0 | | .05 to 3. |
| 1,050 | 1.5 | 434 | 560 | 8 | 0 | | |

[1] Downfeed—.004″ per table reversal. Coolant Conc.—50:1.
[2] Downfeed—.002″ per table reversal. Coolant Conc.—25:1.
[3] Downfeed—.001″ per table reversal. Coolant Conc.—25:1.
[4] Downfeed—.0005″ per table reversal. Coolant Conc.—25:1. Diamonds in 30 to 50 μ size range.
[5] Downfeed—.0002″ per table reversal. Coolant Conc.—25:1. Diamonds in 8 to 25 μ size range.

The Table IV data shows a relatively narrow preferred diamond concentration range for 50–60 grit diamonds of 7.5 to 18 and somewhat broader satisfactory concentration results for additional grinding with smaller sized grits. Thus, for 100–120 grit size satisfactory grinding took place at 15 to 60 diamond concentration but not at 9 diamond concentration, for 200–230 grit size satisfactory grinding took place at 5 to 50 diamond concentration but not at 70 diamond concentration, and for 500 grit size favorable grinding took place at .5 to 9 concentration, unsatisfactory grinding at 20 concentration, and extremely bad operation at 40 and 60 concentration. For 1050 grit size, favorable grinding took place at the remarkably low diamond concentration of .05 to 3 carats per cubic inch.

For the 200–230 grit size and 500 grit size diamonds the sequence in which the tests were run is given. The order of the experiments shows how completely unexpected were the superior wheel performance results with low diamond concentrations at the late stations. With any particular size grit the type of diamonds and wheel construction methods were kept identical for all diamond concentrations, so that for each size the results for different concentrations are completely comparable.

It will be understood that grinding of glass as delivered moval of 5 to 10 mils (rather than approximately 25 mils as used according to Table III), the first 4 or 5 stations of Table III may be omitted and glass with a surface finish of 2 to 3 micro-inches may be obtained by following the teachings of this table regarding the other stations.

These ranges in the preferred number of diamonds on the cutting surface as has been discussed apply for any annular width of the grinding surface on the wheel, for example, a width of ¹⁄₁₆″ of 12″, provided essentially all of the circumference of the wheel contains a diamond grinding surface. With conventional wheel making procedures a width of about ¼″ is preferred.

Referring again to FIG. 8, from the diamond grinding stages, the plate glass sheet is then advanced to iron oxide or rouge "polishing stations," where it is polished in conventional and known manner. The polishing heads at the polishing stations also have vertical spindles and iron oxide or rouge is employed as an abrasive. By virtue of the present invention, the number of iron oxide polishing stations required is reduced or lowered considerably as contrasted to the 42 polishing stations previously required.

After completion of the grinding and polishing of one side of the plate glass, the plate glass is reversed or turned over, blocked and passed through the second side diamond grinding stations and iron oxide polishing stations, also shown in FIG. 8, and similar in structure and number as those employed for grinding and polishing the first side. The grinding and polishing of both sides of the plate glass sheet are then completed.

As pointed out in co-pending application Serial No. 50,352, filed August 18, 1960, basic variables involved in glass grinding with diamond grinding wheels include the rate of feed conveyor speed for the plate glass sheet being ground, and the rate of rotation of the diamond grinding wheel. The conveyor speed or rate of feed of the glass is normally given in terms of inches per minute. Conveyor speeds of 200 inches per minute and higher are practical in the present invention. However, lower speeds of about 175 inches per minute and lower can also be employed. The rate of rotation of the diamond grinding wheel in terms of revolutions per minute is not particularly significant, as the rate or speed at which the grinding surface engages the plate glass is also dependent on the radius of the wheel. With the diamond grinding surface being concentrated near the outer periphery of the grinding wheel, a more useful value is the rate at which the diamond grinding surface passes over and engages the plate glass, in terms of surface feet per minute. This is equal to the circumference of the wheel multiplied by the number of revolutions per unit time of the wheel. Thus, with a wheel having a diameter of about 10 feet, the rate of rotation is about 90 to 95 revolutions per minute in order to produce a relative veocity between the glass and the diamond grinding surface of about 2800 or 3000 surface feet per minute. The stress produced in the glass during the grinding is also a factor of importance, inasmuch as chipping or breakage of glass resulting from high stresses cannot be tolerated to any significant extent. High stresses are produced in the glass with attendant glass chipping or breakage by use of excessively high diamond concentrations when large amounts of stock are to be removed at initial stations in the grinding process. Use of diamond particle sizes which are too large also results in chipping or breakage of the glass. Further, use of lean coolant concentrations are accompanied by an increase in the grinding stresses. The spindle power which is absorbed in indicative of the stresses, and the likelihood of glass chipping or breakage.

The diamond grinding wheels of this invention can have a circular or generally circular wheel support as large as 2 feet, 12 feet, or lager diameter.

There appears to be at all the stages in the diamond grinding of plate glass an optimum pressure for each diamond particle, decreasing with decrease in the average diamond particle size.

The term "diamonds" or "diamond" is used herein in a broad sense to include both natural diamonds and synthetic diamonds having the approximate hardness or other abrasive qualities of natural diamonds. Diamond concentrations have been given in carats per cubic inch, with the carat, which is equal to one-fifth of a gram, being the usual unit of diamond weight. With other abrasives which are not of gem quality, it is regarded as suitable to express concentrations as grams per cubic inch.

An example of the use of cubic boron nitride for plate glass grinding at low concentrations in accordance with this invention is now given. The glass from the melting furnace is ground with diamond wheels for the first 9 stations similarly as previously described in Table III. Wheels are prepared for Stations 10 to 14, in which cubic boron nitride in equal quantities respectively takes the place of the diamonds and in which the same metal-bonding and use of a coolant are provided. Operation with cubic boron nitride wheels is carried out to the same glass removal and surface finish as prescribed in Table III for Stations 10 to 14. Satisfactory grinding and favorable wheel lives are obtained for these segmented cubic boron nitride wheels, these wheels containing the abrasives bonded in the wheel matrix in a concentration less than 1 gram per cubic inch of matrix, with the abrasive grits each being less than 50 microns in size.

In honing surfaces and/or edges of materials in accordance with this invention, the surfaces and/or edge of the material is ground with a grinding wheel having a low concentration of hard abrasive grits bonded in the grinding surface of the wheel matrix. The abrasive grits are those characterized by having a hardness of 8 or higher, preferably 12 or higher on the Extension of Mohs' Scale. Preferred among these hard abrasives are diamonds and cubic boron nitride. The materials which can be honed include metals, for instance, ferrous metals, e.g., iron and steels, stone, glass, ceramics, and cemented carbides. The edges of these materials which can be honed include the edges immediately adjacent and defining holes or orifices. When grinding the surface and/or edge of the material to be honed with a grinding wheel having cubic boron nitride bonded in the grinding surface of the wheel matrix, low concentrations of cubic boron nitride less than 1 gram per cubic inch of matrix can be used. When using a grinding wheel for the honing having diamond grits bonded in the wheel matrix, low concentrations of diamonds of less than 2 carats per cubic inch of matrix can be used. By the term "honing" used herein is meant converting a non-smooth or irregular surface or edge into a smooth even surface or edge, substantially free of irregularities. "Honing" includes the sharpening of edges of materials, for instance the edges of metallic objects, e.g., ferrous metal cutting blades.

The following examples further illustrate the invention. In all of the examples the grooves were 1/16" wide and positioned radially at approximately even spacings on the cutting surfaces of the wheels.

For example, the number and disposition of grooves used may be:

Four—1/16" wide radial grooves at 90° intervals in the cutting surface of the wheel.
Eight—1/16" wide grooves as above, at 45° intervals.
Sixteen—1/16" wide grooves as above, at 22½° intervals.
Thirty-two—1/16" wide grooves as above, at 11¼° intervals.
Forty-eight—1/16" wide grooves as above, at 5⅝° intervals.
Ninety-six—1/16" wide grooves as above, at 2 13/16° intervals.

The grooves extended from the inner to the outer circumference of the cutting surface. New polished glass was used for each test. In each test of Examples I, II and III the table speed was 200 inch/minute and the coolant flow rate was maintained at 3.0 gals. per minute.

EXAMPLE I

The purpose of this example is to show the performance of comparable wheels with very fine hard abrasives with and without grooves.

The performance of 3" O.D. wheels containing 1050 grit size diamonds (8–25 micron powder) and having various diamond concentrations are given in Table V. All grooved wheels are distinguished from those wheels without grooves in the tables.

TABLE V

*1050 grit size (8–25 microns)—3" O.D. wheels*

| Diamond Concentration Carats (Cu. In.) | Downfeed (Inches) | Wheel Face Width (Inches) | Diamond Life, Cu. In. of Glass (Carat) | Net Spindle Power (Watts) | Average Surface Finish (Microinches) |
|---|---|---|---|---|---|
| 1.5 | .0002 | 0.180 | 195 | 560 | 11 |
| 1.5 [1] | .0002 | 0.192 | 434 | 560 | 9 |
| 0.5 | .00015 | 0.170 | 706 | 300 | |
| 0.5 | .0002 | 0.235 | 444 | 480 | 8.5 |
| 0.5 [1] | .0002 | 0.237 | 733 | 360 | 10 |
| 0.25 [1] | .0002 | 0.163 | 4,035 | 480 | 10 |
| 0.25 [1] | .0002 | 0.173 | 3,789 | 560 | 8 |
| | | | Avg. 3,912 | Avg. 520 | Avg. 9 |
| 0.25 [1] | .00015 | 0.185 | 5,526 | 440 | 8 |
| 0.25 [1] | .00015 | 0.197 | 4,268 | 480 | 7 |
| 0.25 [1] | .00015 | 0.210 | 5,377 | 480 | 7.5 |
| | | | Avg. 4,822 | Avg. 480 | Avg. 7.2 |
| 0.25 [1] | .0002 | 0.213 | 2,839 | 580 | 9 |
| 0.25 [2] | .0002 | 0.218 | 4,800 | 520 | 10 |
| | | | Avg. 3,819 | Avg. 550 | Avg. 9.5 |

[1] Four 1/16" radial grooves in wheel cutting surface.
[2] Eight 1/16" radial grooves in wheel cutting surface.

The data in Table V show that under comparable conditions, for diamond concentrations of 1.5 and 0.5 carats/cu. in. the insertion of four 1/16" wide grooves more than doubled the diamond life of these wheels. At diamond concentrations of 0.25 carat/cu. in. without grooves, the wheels could not be operated at nominal downfeeds without excessive burnishing. However, with grooves as described herein, the diamond life of the wheels was typically over 3000 cu. in. of glass/carat at a downfeed of 0.0002".

Comparative performances of wheels with and without grooves for 3" O.D. 500 diamond grit wheels are given in Table VI. The grooved wheels had four 1/16" wide radial grooves spaced at 90° intervals.

TABLE VI

*500 grit size (30–50 microns)—3" O.D. wheels*

Spindle Speed=3600 R.P.M.
Glass Specimens—2"×18"
Downfeed=0.0005"/table reversal

| Diamond Concentration (carats/cu. in.) | Wheel Face Width (Inches) | Diamond Life (cu. in. of glass/carat) | Net Spindle Power (Watts) | Average Surface Finish (Microinches) |
|---|---|---|---|---|
| 1.5* | 0.160 | 892 | 660 | 27.7 |
| 1.5* | 0.220 | 1,516 | 578 | 22.6 |
| 1.5* | 0.225 | 2,071 | 537 | 20.2 |
| 1.5* | 0.240 | 2,101 | 596 | 17.1 |
| 1.5* | 0.275 | 2,120 | 640 | 17.0 |
| 1.5* | 0.300 | 1,735 | 708 | 18.3 |
| 1.5 | 0.245 | 3,864 | 520 | 19.4 |
| 1.5 | 0.250 | 3,906 | 505 | 18.6 |
| 1.5 | 0.260 | 3,930 | 485 | 18.4 |
| | | Avg. 3,900 | Avg. 503 | Avg. 18.8 |

*No radial grooves in wheel surface.

The diamond concentration on all wheels was 1.5 carats/cu. in. which was evaluated as the optimum diamond concentration.

The data of Table VI confirms the statement of Example I that a diamond life of over 3000 cu. in. of glass/carat is possible with all grit sizes from 50/60 to 1050.

EXAMPLE II

The purpose of this example is to show the effect of the number of grooves on the performance of a surfacing wheel. The data in Table VII are for a 3" O.D. wheel of 0.250" wheel face width, containing 1500 grit (6–10 micron diamond powder) at 0.25 carat/cu. in. concentration. After testing the wheel with 8 equally spaced grooves with unsatisfactory operation, additional grooves were cut to give 16 grooves, followed by sufficient testing to obtain the result indicated. Additional grooves were then cut on the same wheel to obtain the 32-groove results.

TABLE VII

*Effect of number of grooves*

Spindle Speed=4400 r.p.m.
Downfeed=.0001"/table reversal
Glass Specimens=2" x 18"

| No. of Grooves | Diamond Life (cu. in. of glass carat) | Net Spindle Power (Watts) | Average Surface Finish (Microinches) |
|---|---|---|---|
| 8 | Unsatisfactory operation under above conditions | | |
| 16* | 902 | 310 | 6.25 |
| 32 | 603 | 320 | 7.0 |

*Optimum No. of Grooves.

From the data in Table VII it can be seen that the wheel with 16 grooves was superior to that with 8 grooves and 32 grooves.

EXAMPLE III

The purpose of this example is to show the relationship between the number of grooves used for satisfactory performance and the grit size for wheels of a given size.

TABLE VIII

*Diamond life and surface finish for 3″ O.D. grooved diamond wheels*

| Grit Size | Diamond Concentration (carats/cu. in.) | Optimum No. of 1/16″ Radial Grooves | Downfeed (inches/ table reversal) | Approx. Wheel Face Width (Inches) | Diamond Life | | Net Spindle Power (Watts) | Surface Finish (Micro-inches) |
|---|---|---|---|---|---|---|---|---|
| | | | | | Cu. In. of glass/carat | Sq. Ft. of glass/carat | | |
| 100/120 | 20 | 0 | 0.002 | 0.160 | 3,165 | 11,000 | 601 | 96 |
| 200/230 | 9 | 4 | 0.001 | 0.330 | 3,200 | 22,200 | 420 | 38 |
| 500 | 1.5 | 4 | 0.0005 | 0.251 | 3,900 | 54,100 | 503 | 19 |
| 1,050 | 0.25 | 8 | 0.0002 | 0.218 | 4,800 | 166,000 | 520 | 10 |
| 1,500 | 0.25 | 16 | 0.0001 | 0.250 | 1,650 | 115,000 | 420 | 6.3 |

In Table VIII the performance of the grooved wheels with various grit sizes is given. The optimum number of grooves is given for each grit size. The data in this table show that as the grit becomes finer, a larger number of grooves is necessary.

All wheels shown in Table VIII contain the same bond. The 1500 grit wheel disclosed therein shows a considerably higher diamond life in carats per cubic inch of glass than the 1500 grit wheel disclosed in Table VII. This difference in performance is believed due to a difference in the wheel bond used.

It should be noted that a diamond life of 1650 cu. in. of glass/carat for a grit size of 1500 (6–12 microns), despite being less than the glass removal for coarser grit, is favorable. The demonstrated finishing of 115,000 sq. ft. of glass/carat with 1500 grit wheels indicates that such wheels are economic.

EXAMPLE IV

The purpose of this example is to illustrate the performance of 30″ O.D. diamond wheels. The diamond life and surface finish of the wheels is given in Table IX. For these tests 20″ x 60″ glass specimens were used and the coolant was supplied at approximately 100 gals./minute.

In evaluating the data of Table IX, the diamond life of 1,219 for the 500 grit-96 groove wheel is equivalent to a diamond life of over 3000 cu. in. of glass per carat in the tests on 3″ O.D. wheels using 2″ x 18″ glass specimens.

The controlling factor was the length of the glass specimen relative to the size of the wheels. It has been found that glass specimen length has a considerable effect upon the diamond wheel performance. In testing the performance of the wheels, with each table reversal the wheel goes off the glass completely. During the going off and coming on stages abnormal pressures are exerted on the cutting wheel surface. Such pressures have been found detrimental to the wheel performance. This problem would obviously not be present where continuous glass lengths are used, but is characteristic of the laboratory equipment used in these tests.

The 60″ glass specimen length used routinely in tests with 30″ wheels does not simulate the continuous glass length of the ultimate plate glass surfacing very well. The 18″ glass specimens used with the 3″ wheels is a closer approximation of the continuous glass application but is still a conservative estimate.

When used in a 30″ wheel, a 60″ specimen of glass would be equivalent to a 6″ specimen of glass used with a 3″ wheel. A diamond life of only 1600 cu. in. of glass per carat was obtained using a specimen of glass 6″ long with a 3″ O.D. wheel. However, if a specimen of glass 18″ long is used with a comparable 3″ wheel, a diamond wheel life of over 3000 cu. in. of glass per carat can be obtained.

Based on evaluation of wheel life with glass specimens of various lengths, it has been found that a 1219 cu. in. of glass/carat diamond life with a 60″ specimen in a 30″ wheel would be equivalent to a diamond life of over 3000 cu. in. of glass per carat if the wheel were operated with continuous glass lengths.

The data in Table IX show that the number of grooves needed for favorable performance of the 30″ wheels increases as the grit becomes finer. Comparing the data in Table IX with that in Table VIII, it can be seen that using 500 grit wheels at a diamond concentration of 1.5 carats per cu. in., the 3″ wheel having 4 grooves produced a diamond life of over 3000 cu. in. of glass per carat and a surface finish of 19 microinches, and the 30″ wheel having 96 grooves produced comparable results.

TABLE IX

*Performance of diamond wheels—approx. 30″ O.D.*

| Grit Size | Diamond Concentration $\left(\frac{carats}{cu.\ in.}\right)$ | No. of [1] 1/16″ Grooves | Downfeed $\left(\frac{inches}{table\ reversal}\right)$ | Approx. Wheel Face Width (Inches) | Diamond Life $\left(\frac{cu.\ in.\ of\ glass}{carat}\right)$ | Net Spindle Power (KW) | Surface Finish (Micro-inches) |
|---|---|---|---|---|---|---|---|
| 500 | 1.5 | 48 | .0005 | 0.230 | 662 | 7.5 | 21 |
| 500 [2] | 1.5 | 96 | .0005 | 0.230 | 1,219 | 6.31 | 21 |

[1] The wheels were assembled from 48 segments, and the segments were assembled to butt closely together making a continuous peripheral wheel. 1/16 grooves were inserted where the segments articulated. For 96 grooves, one additional 1/16 groove was inserted in each segment.

[2] Average of 4 tests.

In a wheel matrix grinding surface 80 of FIG. 11, suitably formed, radially spaced-apart concentric grooves 81 and 82 intersect a plurality of radial grooves 83.

It will be obvious to those skilled in the art that many modifications can be made in the scope of the present invention without departing from the spirit thereof and this invention includes all such modifications.

What is claimed is:

1. A grinding apparatus comprising a rotatable spindle, a diamond grinding wheel mounted coaxially on the spindle, means for rotating the spindle and hence the diamond grinding wheel, means for feeding plate glass horizontally through the apparatus for surface grinding by the wheel, the wheel comprising a support, a metal matrix on the support providing a substantially continuous grinding surface, the matrix having diamond grits bonded therein, the diamond grits having a grit size within the range of 1050–1500 grit size, means securing the matrix to the support, a plurality of spaced radial grooves formed in the wheel matrix grinding surface, and means for supplying a liquid coolant to the grinding surface.

2. A grinding apparatus comprising a rotatable spindle, a grinding wheel mounted coaxially on the spindle, means for rotating the spindle and hence the grinding wheel, means for feeding plate glass horizontally through the apparatus for surface grinding by the wheel, the wheel comprising a support, a metal matrix on the support providing a substantially continuous grinding surface, the matrix having hard abrasive grits bonded therein, the abrasive grits having a grit size within the range of 500–2500 grit size, means securing the matrix to the support member, a plurality of spaced radial grooves formed in the matrix grinding surface, and means for supplying a liquid coolant to the grinding surface.

3. A grinding apparatus comprising a rotatable spindle, a grinding wheel mounted coaxially on the spindle, means for rotating the spindle and hence the grinding wheel, means for feeding glass through the apparatus for surface grinding by the wheel, the wheel comprising a support, a metal matrix on the support providing a substantially continuous grinding surface, the matrix having hard abrasive grits bonded therein, the abrasive grits having a grit size not greater than 200–230 grit size, means securing the matrix to the support, a plurality of spaced radial grooves formed in the wheel matrix grinding surface, and means for supplying a liquid coolant to the grinding surface.

4. The grinding apparatus of claim 3 wherein the fine hard abrasive grits are diamond grits.

5. A grinding apparatus comprising a rotatable spindle, a grinding wheel mounted on the spindle, means for rotating the spindle and hence the grinding wheel, means for feeding plate glass through the apparatus for surface grinding by the wheel, the wheel comprising a support, a matrix on the support providing a substantially continuous grinding surface, the matrix having hard abrasive grits of a grit size not greater than 200–230 grit size bonded therein, means securing the matrix to the support, a plurality of spaced grooves formed in the wheel matrix grinding surface, and means for supplying a coolant to the wheel grinding surface.

6. A grinding apparatus comprising a rotatable spindle, a grinding wheel mounted coaxially on the spindle, means for rotating the spindle and hence the grinding wheel, means for feeding plate glass through the apparatus for surface grinding by the diamond wheel, the wheel comprising a support, a matrix on the support providing a substantially continuous grinding surface, the matrix having diamond grits of a grit size not greater than 200–230 grit size bonded therein, means securing the matrix to the support, a plurality of spaced radial grooves of predetermined width and configuration formed in the wheel matrix grinding surface for promoting a predetermined distribution of liquid coolant in intromissive flow across said grinding surface in grinding relation with the plate glass and means for supplying liquid coolant to the grinding surface.

7. The apparatus of claim 6 wherein said diamond grits have a grit size within the range of 1050–1500 grit size.

8. The apparatus of claim 6 further characterized by at least one concentric group being provided in said wheel matrix grinding surface, said concentric grooves intersecting said radial grooves.

9. A grinding apparatus including a rotatable spindle, a diamond grinding wheel mounted coaxially on the spindle, means for rotating the spindle and hence the grinding wheel, means for feeding a flat sheet of glass or the like through the apparatus for surface grinding by the diamond wheel, the wheel comprising a support, a matrix on said support providing a substantially continuous grinding surface, said matrix having diamond grits of a grit size not greater than 200–230 grit size bonded therein in a concentration not greater than 9 carats per cubic inch, means for securing said matrix to said support, a plurality of spaced radial grooves of predetermined width and configuration formed in said wheel matrix grinding surface for promoting a predetermined distribution of liquid coolant in intromissive flow across said grinding surface in grinding relation with the sheet of glass, and means for supplying liquid coolant to said grinding surface.

10. A grinding apparatus including a rotatable spindle, a diamond wheel mounted coaxially on the spindle, means for rotating the spindle and hence the grinding wheel, means for feeding a flat sheet of glass or the like through the apparatus for surface grinding by the diamond wheel, the wheel comprising a support, a plurality of adjacent arcuate grinding segments having exposed matrices forming a substantially continuous circular grinding surface located adjacent the periphery of said grinding wheel support, each of said arcuate grinding segments having at least one radial groove formed therein intermediate the ends thereof and of a predetermined size and configuration for promoting a predetermined distribution of liquid coolant in intromissive flow across said grinding surface in grinding relation with the flat sheet of glass, said matrices having diamond grits of a grit size not greater than 200–230 grit size bonded therein in a concentration not greater than 9 carats per cubic inch, means for securing said grinding segments to said support, and means for supplying the liquid coolant to said grinding surface.

References Cited by the Examiner

UNITED STATES PATENTS

| 1,932,305 | 10/1933 | Escole | 51—110 |
|---|---|---|---|
| 2,787,100 | 4/1957 | Peyches | 51—283 |
| 2,823,496 | 2/1958 | Winter | 51—267 X |
| 2,867,063 | 1/1959 | Metzger | 51—209 |
| 2,883,801 | 4/1959 | Dryon | 51—110 |
| 2,942,387 | 6/1960 | Lindblad | 51—209 |
| 2,985,898 | 5/1961 | Knost | 51—110 X |
| 2,022,521 | 7/1961 | Glasgow | 51—283 |
| 3,026,655 | 3/1962 | Osenberg | 51—209 |

ROBERT C. RIORDON, *Primary Examiner.*

FRANK H. BRONAUGH, LESTER M. SWINGLE, J. SPENCER OVERHOLSER, *Examiners.*